US012700130B2

(12) United States Patent     (10) Patent No.:   US 12,700,130 B2
Dong     (45) Date of Patent:     Aug. 4, 2026

(54) METHOD, APPARATUS AND COMPUTER PROGRAM PRODUCT FOR INCREASING POSITIONING PRECISION OF VEHICLE

(71) Applicant: Robert Bosch GmbH, Stuttgart (DE)

(72) Inventor: Jialing Dong, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 18/517,531

(22) Filed: Nov. 22, 2023

(65) Prior Publication Data

US 2024/0185452 A1     Jun. 6, 2024

(30) Foreign Application Priority Data

Dec. 1, 2022    (CN) ......................... 202211532243.0

(51) Int. Cl.
    *G06T 7/73*       (2017.01)
    *G06V 20/56*      (2022.01)
(52) U.S. Cl.
    CPC ............... *G06T 7/73* (2017.01); *G06V 20/56* (2022.01); *G06T 2207/20081* (2013.01); *G06T 2207/30252* (2013.01)

(58) Field of Classification Search
    CPC ............. G06T 7/73; G06T 2207/20081; G06T 2207/30252; G06V 20/56; G06V 10/765; G06V 10/774; G06N 20/00
    USPC ......................................................... 382/100
    See application file for complete search history.

(56) References Cited

U.S. PATENT DOCUMENTS

2022/0357463 A1* 11/2022 Nurminen .......... G06Q 10/0833
2023/0332897 A1* 10/2023 Hikasa ................... G01C 21/30

FOREIGN PATENT DOCUMENTS

CN     107767696     *   3/2018    ............. G08G 1/166
JP      2021152492    *   9/2021

* cited by examiner

*Primary Examiner* — Jerome Grant, II
(74) *Attorney, Agent, or Firm* — Maginot, Moore & Beck LLP

(57) ABSTRACT

A method, apparatus and computer program product for increasing the positioning precision of a vehicle is disclosed. An actually measured position of a vehicle may be obtained. A vehicle environment feature corresponding to the actually measured position may be detected. A position compensation value may be computed on the basis of the vehicle environment feature. The position compensation value may be used to compensate the actually measured position so as to increase the positioning precision of the vehicle.

13 Claims, 6 Drawing Sheets

100

100

400

METHOD, APPARATUS AND COMPUTER PROGRAM PRODUCT FOR INCREASING POSITIONING PRECISION OF VEHICLE

This application claims priority under 35 U.S.C. § 119 to patent application no. CN 2022 1153 2243.0, filed on Dec. 1, 2022 in China, the disclosure of which is incorporated herein by reference in its entirety.

The present disclosure relates to the field of motor vehicles, in particular to a method, apparatus and computer program product for increasing the positioning precision of a vehicle.

BACKGROUND

Modern vehicles are generally equipped with a positioning module for ascertaining vehicle position. The positioning module can ascertain and provide the vehicle position by receiving a satellite navigation signal. The positioning precision of the positioning module will be affected by the vehicle's surrounding environment. For example, when the vehicle is travelling on a spacious, wide open road surface, for example on a motorway, the positioning module is generally able to provide a more accurate vehicle position. However, when the vehicle is travelling in a city with large numbers of tall buildings or passing over a bridge or through a tunnel, etc., the position provided by the positioning system is sometimes inaccurate, and this results in considerable fluctuation in the positioning precision. This is because objects such as storeyed buildings, trees, bridges and tunnels block the satellite navigation signal, and consequently the positioning module is unable to ascertain an accurate vehicle position.

Thus, it is hoped to provide an improved technical solution to solve the abovementioned problem in the prior art.

SUMMARY

In response to the above problem, the aim of the present disclosure is to propose a method, apparatus and computer program product for increasing the positioning precision of a vehicle.

The present disclosure provides a method for increasing the positioning precision of a vehicle. The method may comprise: obtaining an actually measured position of a vehicle; detecting a vehicle environment feature corresponding to the actually measured position; computing a position compensation value on the basis of the vehicle environment feature; and using the position compensation value to compensate the actually measured position, so as to increase the positioning precision of the vehicle.

In an embodiment, the step of detecting a vehicle environment feature corresponding to the actually measured position may comprise: obtaining a time corresponding to the actually measured position; obtaining an image relating to a surrounding environment of the vehicle, captured by a sensor of the vehicle at said time; identifying a blocking object in the image; detecting an object feature of the blocking object, the object feature comprising at least one of the following: a category of the blocking object, a shape of the blocking object, a size of the blocking object, and a position of the blocking object relative to the vehicle; and combining the object feature and/or the time to form the vehicle environment feature.

The step of identifying a blocking object in the image may comprise: identifying an object having a predefined category from the image by means of image recognition technology, the predefined category comprising at least one of storeyed buildings, trees, bridges and tunnels; and taking the identified object to be the blocking object.

In an embodiment, the step of computing a position compensation value on the basis of the vehicle environment feature may comprise: computing the position compensation value on the basis of the vehicle environment feature by means of a compensation value computing model.

Training of the compensation value computing model may comprise: generating a training data set by means of a test vehicle and a position simulation system; and using the training data set to train the compensation value computing model.

The step of generating a training data set by means of a test vehicle and a position simulation system may comprise: obtaining a set of actually measured position samples outputted by a positioning module of the test vehicle; obtaining a set of simulated position samples outputted by the position simulation system; forming multiple error position pairs by means of the set of actually measured position samples and the set of simulated position samples; generating multiple training samples on the basis of the multiple error position pairs; and combining the multiple training samples to form the training data set.

The set of actually measured position samples and the set of simulated position samples may be generated under identical conditions. The identical conditions may comprise identical vehicles, identical starting points, identical end points and identical routes of travel.

The step of forming multiple error position pairs by means of the set of actually measured position samples and the set of simulated position samples may comprise, for each actually measured position sample in the set of actually measured position samples: extracting, from the set of simulated position samples, a simulated position sample whose time is the same as the time of the actually measured position sample; computing a difference value between the actually measured position sample and the simulated position sample; determining whether the difference value exceeds a predetermined threshold; and in response to determining that the difference value exceeds the predetermined threshold, combining the actually measured position sample and the simulated position sample to form an error position pair.

The step of generating multiple training samples on the basis of the multiple error position pairs may comprise, for each of the multiple error position pairs: detecting a vehicle environment feature sample corresponding to an actually measured position sample in the error position pair; generating a position compensation value label corresponding to the vehicle environment feature sample by computing a difference value between the actually measured position sample and a simulated position sample in the error position pair; and combining the vehicle environment feature sample and the position compensation value label to form a training sample corresponding to the error position pair.

The step of detecting a vehicle environment feature sample corresponding to an actually measured position sample in the error position pair comprises: obtaining a time sample corresponding to the error position pair; obtaining an image sample relating to a surrounding environment of the test vehicle, captured by a sensor of the test vehicle at said time sample; identifying a blocking object sample in the image sample; detecting an object feature sample of the blocking object sample, the object feature sample comprising at least one of the following: a category of the blocking object sample, a shape of the blocking object sample, a size of the blocking object sample, and a position of the blocking object sample relative to the test vehicle; and combining the object feature sample and/or the time sample to form the vehicle environment feature sample.

The present disclosure further provides an apparatus for increasing the positioning precision of a vehicle. The apparatus may comprise: an actually measured position obtaining module, for obtaining an actually measured position of a vehicle; a vehicle environment feature detecting module, for detecting a vehicle environment feature corresponding to the actually measured position; a compensation value computing module, for computing a position compensation value on the basis of the vehicle environment feature; and a position compensating module, for using the position compensation value to compensate the actually measured position, so as to increase the positioning precision of the vehicle.

In an embodiment, the vehicle environment feature detecting module may comprise: a time obtaining module, for obtaining a time corresponding to the actually measured position; an image obtaining module, for obtaining an image relating to a surrounding environment of the vehicle, captured by a sensor of the vehicle at said time; a blocking object identifying module, for identifying a blocking object in the image; an object feature detecting module, for detecting an object feature of the blocking object, the object feature comprising at least one of the following: a category of the blocking object, a shape of the blocking object, a size of the blocking object, and a position of the blocking object relative to the vehicle; and a vehicle environment feature combining module, for combining the object feature and/or the time to form the vehicle environment feature.

In an embodiment, the compensation value computing module may be a compensation value computing model based on machine learning. Training of the compensation value computing model may comprise: generating a training data set by means of a test vehicle and a position simulation system; and using the training data set to train the compensation value computing model.

The present disclosure further provides an apparatus for increasing the positioning precision of a vehicle. The apparatus may comprise: a processor; and a memory, storing a computer-executable instruction which, when executed, causes the processor to implement the method described above for increasing the positioning precision of a vehicle.

The present disclosure further provides a computer program product for increasing the positioning precision of a vehicle. The computer program product comprises a computer program which is executed by a processor to implement the method described above for increasing the positioning precision of a vehicle.

Using the above-described technical approach of the present disclosure, a position compensation value may be computed on the basis of a vehicle environment feature corresponding to an actually measured position of a vehicle, and the position compensation value may be used to compensate the actually measured position, thereby increasing the positioning precision of the vehicle.

BRIEF DESCRIPTION OF THE DRAWINGS

A more comprehensive understanding of the abovementioned and other aspects of the present disclosure will be gained from the detailed description below with reference to the following drawings. It must be pointed out that the drawings might have different scales for the purpose of clear explanation, but this will not affect understanding of the present disclosure. In the drawings.

DETAILED DESCRIPTION

The present disclosure will now be discussed with reference to various exemplary embodiments. It should be understood that the discussion of these embodiments is merely intended to enable those skilled in the art to better understand and thereby implement embodiments of the present disclosure, rather than teaching any limitation of the scope of the present disclosure.

Embodiments of the present disclosure are described in detail below with reference to the drawings.

Figure 1:
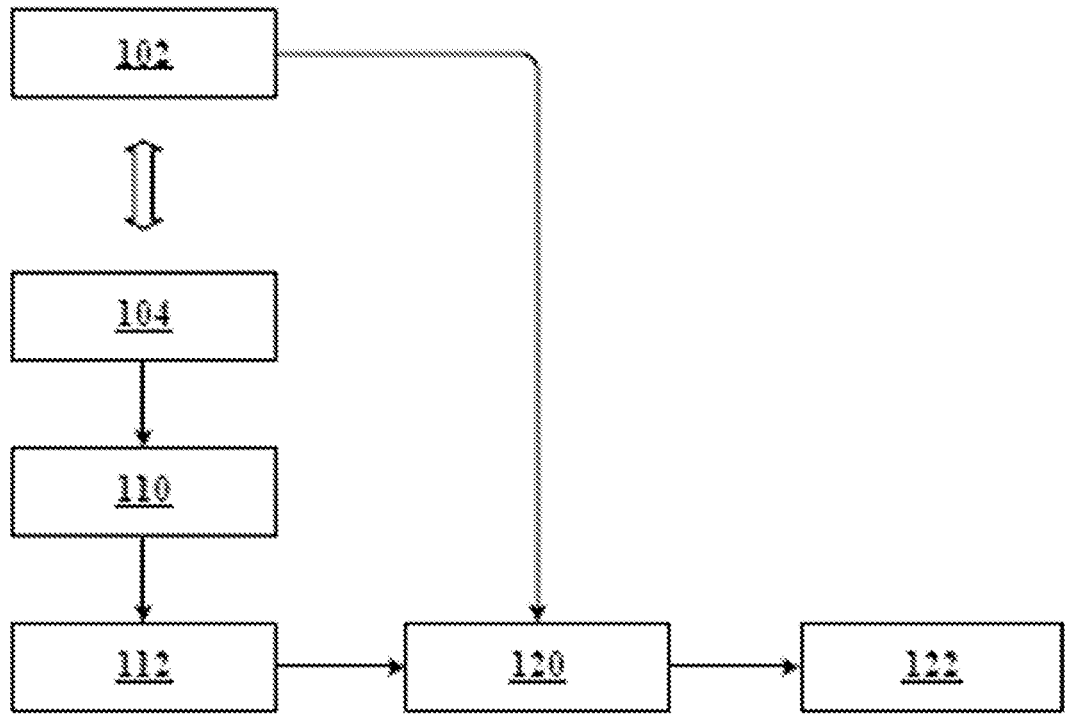
FIG. 1 shows an exemplary process for increasing the positioning precision of a vehicle according to embodiments of the present disclosure.

FIG. 1 shows an exemplary process 100 for increasing the positioning precision of a vehicle according to embodiments of the present disclosure. The process 100 may take place in real time during vehicle travel, and it is thus possible to compensate an actually measured position of the vehicle in real time, to increase the positioning precision of the vehicle.

An actually measured position 102 of the vehicle may be obtained. The actually measured position 102 may be outputted by a positioning module in the vehicle. As an example, the positioning module may be a vehicle motion and position sensor (VMPS).

A vehicle environment feature 104 corresponding to the actually measured position 102 may be detected. The vehicle environment feature 104 may comprise a feature associated with the vehicle's environment and time. An exemplary process for detecting the vehicle environment feature is explained below with reference to FIG. 2.

A position compensation value 112 may then be computed on the basis of the vehicle environment feature 104 by means of a compensation value computing model 110. The compensation value computing model 110 may be a machine learning model. When training the compensation value computing model 110, a training data set may first be generated by means of a test vehicle and a position simulation system, then the training data set may be used to train the compensation value computing model 110. An exemplary process for generating the training data set is explained below with reference to FIGS. 3-5.

After computing the position compensation value 112, the position compensation value 112 may be used to compensate the actually measured position 102 by means of a position compensating module 120, so as to obtain a compensated position 122, thereby increasing the positioning precision of the vehicle.

Figure 2:
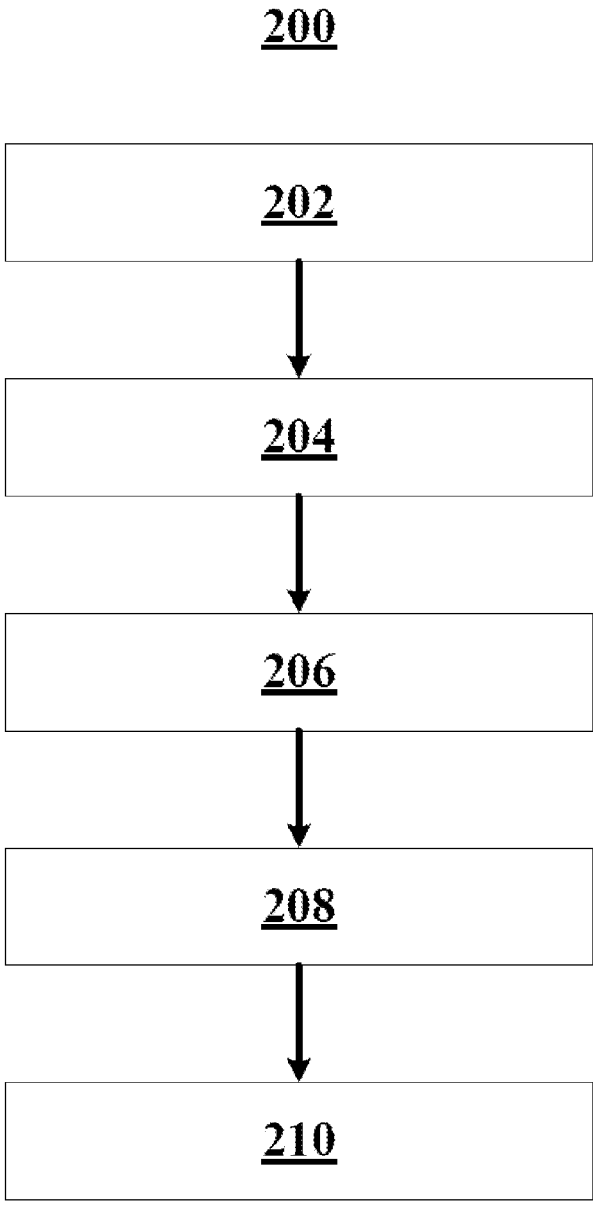
FIG. 2 shows an exemplary process for detecting a vehicle environment feature corresponding to an actually measured position according to embodiments of the present disclosure.

FIG. 2 shows an exemplary process 200 for detecting a vehicle environment feature corresponding to an actually measured position according to embodiments of the present disclosure. The vehicle environment feature corresponding to the actually measured position, for example the vehicle environment feature 104 in FIG. 1, may be obtained by the process 200. The vehicle environment feature may be used to compute a position compensation value.

At 202, a time corresponding to the actually measured position may be obtained.

At 204, an image relating to a surrounding environment of the vehicle, captured by a sensor of the vehicle at that time, may be obtained.

At 206, a blocking object in the image may be identified. For example, an object having a predefined category may be identified from the image by image recognition technology. The predefined category may be a predefined category of objects capable of blocking satellite signals, comprising for example storeyed buildings, trees, bridges, tunnels, etc. The identified object may be taken to be a blocking object.

At 208, an object feature of the blocking object may be detected. The object feature may comprise for example a category of the blocking object, a shape of the blocking object, a size of the blocking object, a position of the blocking object relative to the vehicle, etc. These features are factors that might affect the reception of satellite navigation signals by the vehicle. For example, when the blocking object is located at different positions relative to the vehicle, the degree to which it blocks satellite signals will also vary. Having the position of the blocking object relative to the vehicle included in the vehicle environment feature helps to obtain a more accurate compensation value computation result.

At 210, the object feature and/or the time may be combined to form the vehicle environment feature. At different times, a navigation satellite might be located at different positions relative to the vehicle. Correspondingly, the degree to which the blocking object blocks satellite signals will also vary. Having the time included in the vehicle environment feature helps to obtain a more accurate compensation value computation result.

The processes 100 and 200 may take place in real time during vehicle travel, and it is thus possible to compensate the actually measured position of the vehicle in real time, to increase the positioning precision of the vehicle. In the processes described above, the position compensation value 112 may be computed on the basis of the vehicle environment feature 104 corresponding to the actually measured position 102 of the vehicle, and the position compensation value 112 may be used to compensate the actually measured position 102, thereby increasing the positioning precision of the vehicle.

It should be understood that the process for increasing the positioning precision of a vehicle as described above with reference to FIGS. 1 and 2 is merely exemplary. Steps in the process for increasing the positioning precision of a vehicle may be replaced or amended in any way according to actual disclosure needs, and the process may comprise more or fewer steps. For example, although the object feature comprises the category of the blocking object, the shape of the blocking object, the size of the blocking object, the position of the blocking object relative to the vehicle, etc., in the description above, it is also possible for the object feature to only comprise any one or more of these items. Furthermore, the vehicle environment feature may or may not comprise the time corresponding to the actually measured position. In addition, the specific order or hierarchy of the steps in the processes 100 and 200 is merely exemplary, and the process for increasing the positioning precision of a vehicle may be executed in a different order from that described.

Figure 3:
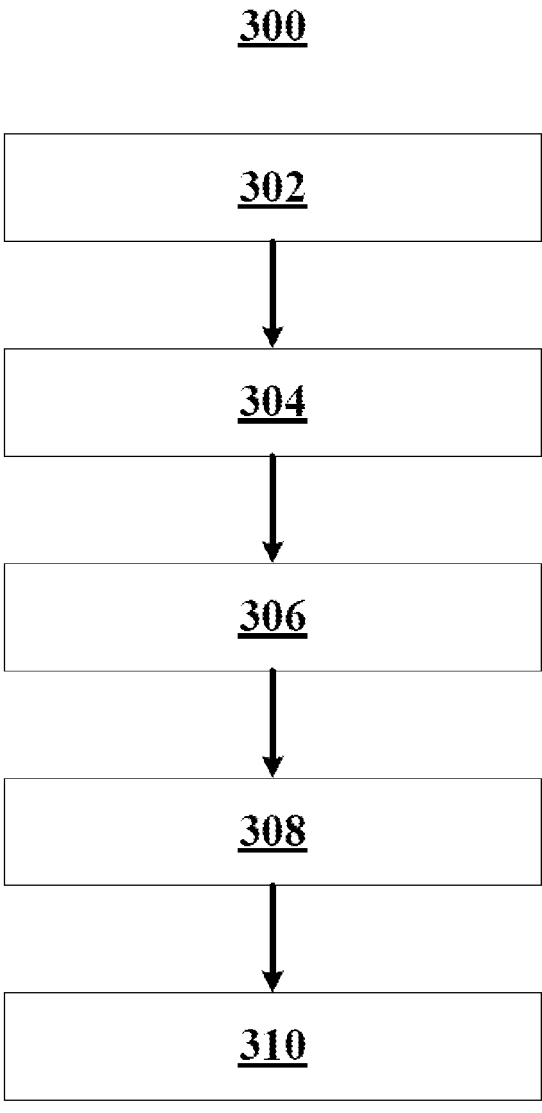
FIG. 3 shows an exemplary process for generating a training data set for a compensation value computing model according to embodiments of the present disclosure.

FIG. 3 shows an exemplary process 300 for generating a training data set for a compensation value computing model according to embodiments of the present disclosure. Through the process 300, it is possible to generate a training data set for training a compensation value computing model, for example the compensation value computing model 110 in FIG. 1. In the process 300, a training data set may be generated by means of a test vehicle and a position simulation system.

At 302, a set of actually measured position samples outputted by a positioning module of the test vehicle may be obtained. The test vehicle may be caused to travel in various scenarios or various road conditions, and a set of actually measured positions outputted by the positioning module of the test vehicle may be obtained.

At 304, a set of simulated position samples outputted by the position simulation system may be obtained. Preferably, the set of actually measured position samples and the set of simulated position samples may be generated under identical conditions. The identical conditions may include, for example, identical vehicles, identical starting points, identical end points, identical routes of travel, etc. During operation, the position simulation system may set a surrounding environment of the vehicle to be a spacious, wide open road surface, e.g. a road surface without any objects that might block satellite navigation signals. Simulated position samples outputted in such circumstances may be regarded as being precise and true positions.

At 306, multiple error position pairs may be formed by means of the set of actually measured position samples and the set of simulated position samples. An exemplary process for forming an error position pair is explained below with reference to FIG. 4.

At 308, multiple training samples may be generated on the basis of the multiple error position pairs. An exemplary process for generating a training sample is explained below with reference to FIG. 5.

At 310, the multiple training samples may be combined to form a training data set.

Figure 4:
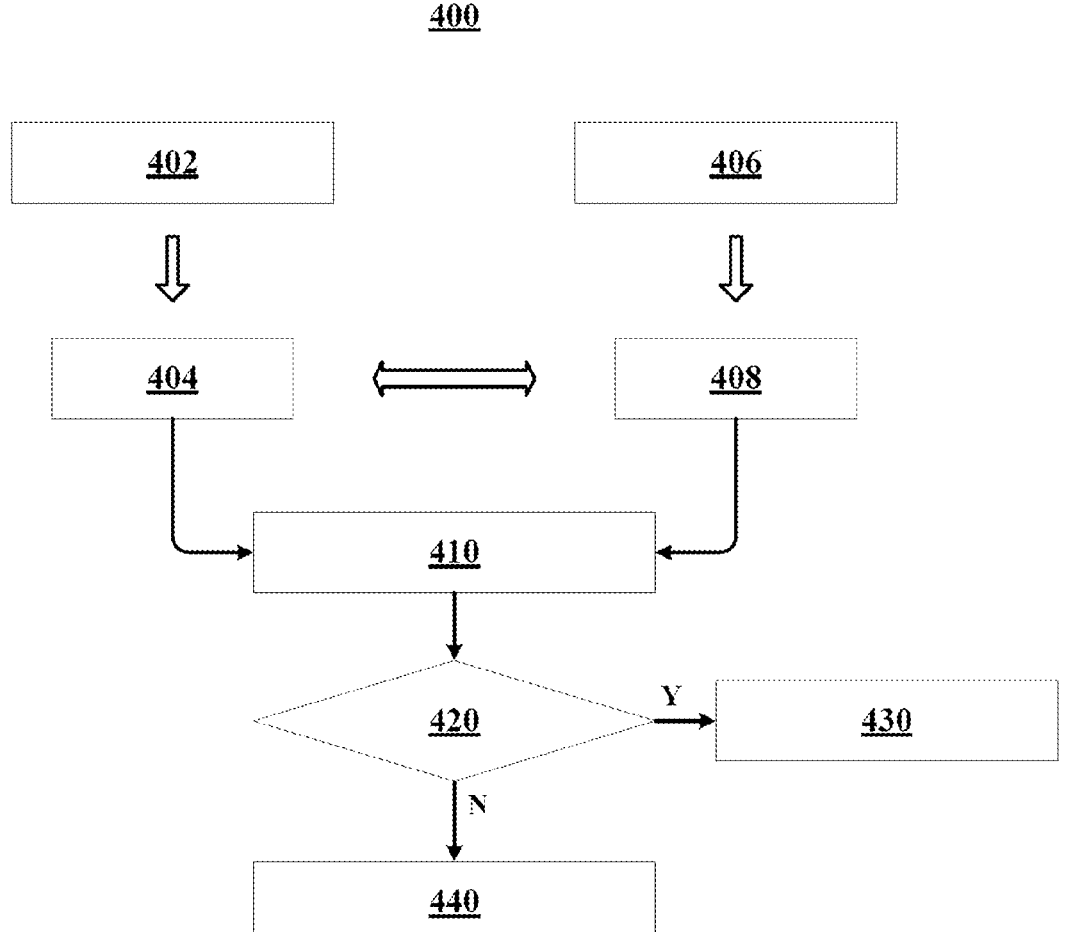
FIG. 4 shows an exemplary process for forming an error position pair according to embodiments of the present disclosure.

FIG. 4 shows an exemplary process 400 for forming an error position pair according to embodiments of the present disclosure. The process 400 may correspond to step 306 in FIG. 3. The process 400 may be executed for a set of actually measured position samples 402 and a set of simulated position samples 406.

An actually measured position sample 404 may be one position sample in the set of actually measured position samples 402. A simulated position sample 408 whose time is the same as the time of the actually measured position sample 404 may be extracted from the set of simulated position samples 406. That is to say, the actually measured position sample 404 and the simulated position sample 408 are generated at the same time.

Then at 410, a difference value between the actually measured position sample 404 and the simulated position sample 408 may be computed.

At 420, we may determine whether the difference value exceeds a predetermined threshold. As an example, the predetermined threshold may be 0.5 metres.

If it is determined at 420 that the difference value exceeds the predetermined threshold, the process 400 proceeds to 430. At 430, the actually measured position sample 404 and the simulated position sample 408 may be combined to form an error position pair.

If it is determined at 420 that the difference value does not exceed the predetermined threshold, the process 400 proceeds to 440. At 440, the process 400 ends.

The process 400 may be executed for each actually measured position sample in the set of actually measured position samples 402, so as to obtain multiple error position pairs. The multiple error position pairs may be used to generate multiple training samples for training the compensation value computing model.

Figure 5:
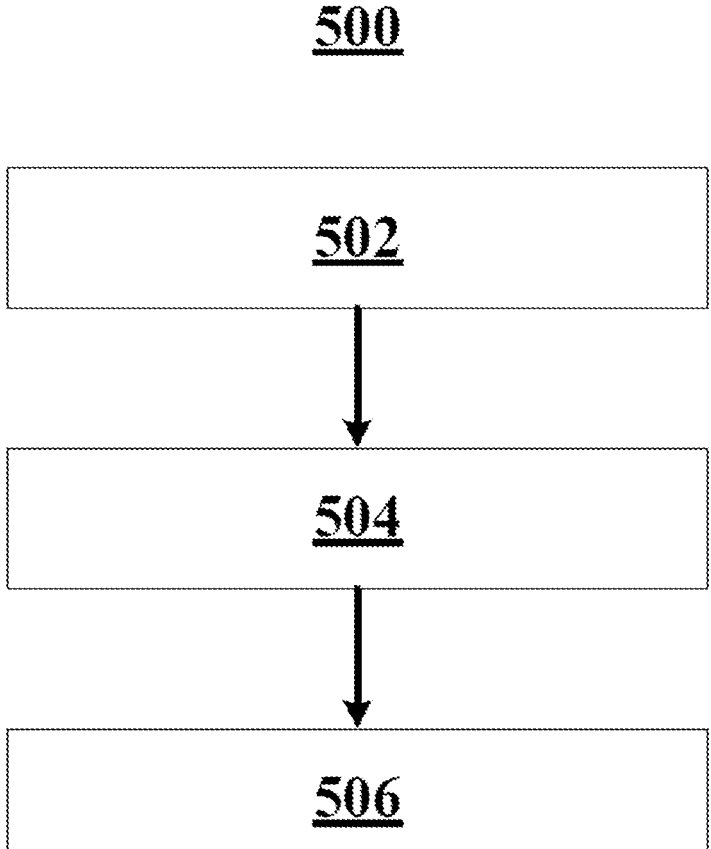
FIG. 5 shows an exemplary process for generating a training sample on the basis of an error position pair according to embodiments of the present disclosure.

FIG. 5 shows an exemplary process 500 for generating a training sample on the basis of an error position pair according to embodiments of the present disclosure. The process 500 may correspond to step 308 in FIG. 3.

At 502, a vehicle environment feature sample corresponding to an actually measured position sample in the error position pair may be detected. The vehicle environment feature sample may be detected by a process similar to the process for detecting a vehicle environment feature as shown in the process 200 in FIG. 2. For example, a time sample corresponding to the error position pair may first be obtained. Next, an image sample relating to a surrounding environment of a test vehicle, captured by a sensor of the test vehicle at that time sample, may be obtained. Next, a blocking object sample in the image sample may be identified. For example, an object having a predefined category may be identified from the image sample by image recognition technology. The predefined category may be storeyed buildings, trees, bridges, tunnels, etc. The identified object may be taken to be the blocking object sample. An object feature sample of the blocking object sample may be detected. The object feature sample may comprise, for example, the category of the blocking object sample, the shape of the blocking object sample, the size of the blocking object sample, the position of the blocking object sample relative to the test vehicle, etc. Finally, the object feature sample and/or the time sample may be combined to form the vehicle environment feature sample.

At 504, a position compensation value label corresponding to the vehicle environment feature sample may be generated by computing a difference value between the actually measured position sample and a simulated position sample in the error position pair. The simulated position sample is outputted by the position simulation system, and may be regarded as being a precise and true position. The difference value between the actually measured position sample and the simulated position sample may be regarded as the difference value between the actually measured position sample and the precise and true position. Thus, such a difference value may be used as the position compensation value label.

At 506, the vehicle environment feature sample and the position compensation value label may be combined to form a training sample corresponding to the error position pair. That is to say, the training sample may comprise the vehicle environment feature sample and the position compensation value label corresponding to the vehicle environment feature sample. Correspondingly, a compensation value computing model trained using such a training sample may, based on an inputted vehicle environment feature, output a position compensation value corresponding to the vehicle environment feature.

The process 500 may be executed for each of multiple error position pairs, so as to obtain multiple training samples corresponding to the multiple error position pairs. The multiple training samples may be combined to form a training data set for training a compensation value computing model, for example the compensation value computing model 110 in FIG. 1.

In the process described above, the test vehicle may be caused to travel in as many different scenarios or road conditions as possible, so as to obtain a huge number of actually measured position samples, and vehicle environment feature samples covering various scenarios or road conditions. Correspondingly, the position simulation system may be caused to output a huge number of simulated position samples. In this way, ample training samples for training the compensation value computing model may be generated. When deployed, the compensation value computing model trained using the training data set containing ample training samples can output accurate position compensation values.

It should be understood that the process for generating a training data set for a compensation value computing model as described above with reference to FIGS. 3-5 is merely exemplary. Steps in the process for generating the training data set may be replaced or amended in any way according to actual disclosure needs, and the process may comprise more or fewer steps. In addition, the specific order or hierarchy of the steps in the processes 300-500 is merely exemplary, and the process for generating a training data set for a compensation value computing model may be executed in a different order from that described.

Figure 6:
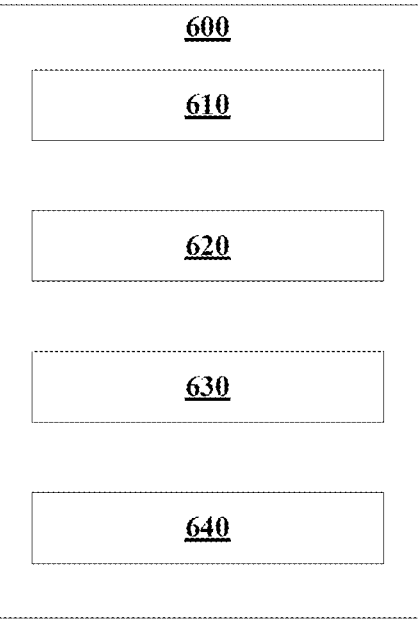
FIG. 6 shows an exemplary apparatus for increasing the positioning precision of a vehicle according to embodiments of the present disclosure.

FIG. 6 shows an exemplary apparatus 600 for increasing the positioning precision of a vehicle according to embodiments of the present disclosure. The apparatus 600 may comprise: an actually measured position obtaining module 610, for obtaining an actually measured position of a vehicle; a vehicle environment feature detecting module 620, for detecting a vehicle environment feature corresponding to the actually measured position; a compensation value computing module 630, for computing a position compensation value on the basis of the vehicle environment feature; and a position compensating module 640, for using the position compensation value to compensate the actually measured position, so as to increase the positioning precision of the vehicle. In addition, the apparatus 600 may also comprise any other module according to the above embodiments of the present disclosure, configured to increase the positioning precision of a vehicle.

Figure 7:
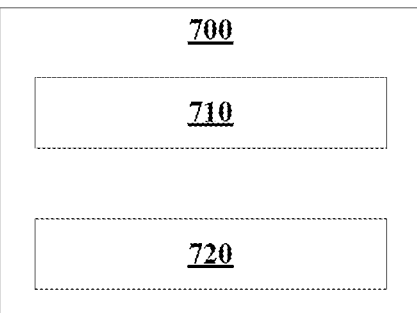
FIG. 7 shows another exemplary apparatus for increasing the positioning precision of a vehicle according to embodiments of the present disclosure.

FIG. 7 shows another exemplary apparatus 700 for increasing the positioning precision of a vehicle according to embodiments of the present disclosure. The apparatus 700 may comprise: a processor 710; and a memory 720 storing a computer-executable instruction. The computer-executable instruction, when executed, can cause the processor 710 to perform any operation of the method for increasing the positioning precision of a vehicle as described above.

Embodiments of the present disclosure propose a computer program product for increasing the positioning precision of a vehicle, comprising a computer program which is executed by a processor to perform any operation of the method for increasing the positioning precision of a vehicle as described above.

Embodiments of the present disclosure may be embodied in a non-transitory computer-readable medium. The non-transitory computer-readable medium may comprise an instruction which, when executed, causes a processor to perform any operation of the method for increasing the positioning precision of a vehicle as described above.

It should be understood that all of the modules in the apparatus described above may be implemented in various ways. These modules may be implemented as hardware, software, or a combination thereof. In addition, any of these modules may be functionally further split into sub-modules or combined.

Processors have already been described with in conjunction with various apparatuses and methods. These processors may be implemented using electronic hardware, computer software or any combination thereof. Whether these processors are implemented as hardware or software will depend on the specific application and the overall design constraints applied to the system. As an example, the processors, any part of the processors, or any combination of the processors provided in the present disclosure may be implemented as microprocessors, microcontrollers, digital signal processors (DSP), field-programmable gate arrays (FPGA), programmable logic devices (PLD), state machines, gate logic, discrete hardware circuits, and other suitable processing components configured to execute various functions described in the present disclosure. The functions of the processors, any part of the processors, or any combination of the processors provided in the present disclosure may be implemented as software executed by microprocessors, microcontrollers, DSP or other suitable platforms.

Those skilled in the art will understand that various amendments and changes could be made to the embodiments set forth herein without deviating from the substance of the disclosure; all such amendments and changes should fall within the scope of protection of the present disclosure, and the scope of protection of the present disclosure should be defined by the claims.

What is claimed is:

1. A method for increasing a positioning precision of a vehicle, comprising:
    obtaining an actually measured position of the vehicle;
    detecting a vehicle environment feature corresponding to the actually measured position;
    computing a position compensation value based on the vehicle environment feature; and
    using the position compensation value to compensate the actually measured position to increase the positioning precision of the vehicle,
    wherein detecting the vehicle environment feature comprises:
        obtaining a time corresponding to the actually measured position;
        obtaining an image relating to a surrounding environment of the vehicle captured by a sensor of the vehicle at the time;
        identifying a blocking object in the image;
        detecting an object feature of the blocking object, the object feature comprising at least one of (i) a category of the blocking object, (ii) a shape of the blocking object, (iii) a size of the blocking object, and (iv) a position of the blocking object relative to the vehicle; and
        combining the object feature and/or the time to form the vehicle environment feature.

2. The method according to claim 1, wherein identifying the blocking object in the image comprises:
    identifying an identified object having a predefined category from the image using image recognition technology, the predefined category comprising at least one of multi-story buildings, trees, bridges, and tunnels; and
    the identified object is the blocking object.

3. The method according to claim 1, wherein computing the position compensation value comprises:

computing the position compensation value based on the vehicle environment feature using a compensation value computing model.

4. An apparatus for increasing the positioning precision of the vehicle, comprising:
    a processor; and
    a non-transitory memory, storing a computer-executable instruction which, when executed, causes the processor to implement the method according to claim 1.

5. A computer program product for increasing the positioning precision of the vehicle, comprising a computer program configured to be executed by a processor to implement the method according to claim 1.

6. A method for increasing a positioning precision of a vehicle, comprising:
    obtaining an actually measured position of the vehicle;
    detecting a vehicle environment feature corresponding to the actually measured position;
    computing a position compensation value based on the vehicle environment feature using a compensation value computing model; and
    using the position compensation value to compensate the actually measured position to increase the positioning precision of the vehicle,
    wherein training of the compensation value computing model comprises (i) generating a training data set using a test vehicle and a position simulation system, and (ii) using the training data set to train the compensation value computing model.

7. The method according to claim 6, wherein generating the training data set comprises:
    obtaining a set of actually measured position samples;
    obtaining a set of simulated position samples outputted by the position simulation system;
    forming multiple error position pairs using the set of actually measured position samples and the set of simulated position samples;
    generating multiple training samples based on the multiple error position pairs; and
    combining the multiple training samples to form the training data set.

8. The method according to claim 7, wherein the set of actually measured position samples and the set of simulated position samples are generated under identical conditions, the identical conditions comprising identical vehicles, identical starting points, identical end points and identical routes of travel.

9. The method according to claim 7, wherein forming multiple error position pairs comprises, for each actually measured position sample in the set of actually measured position samples:
    extracting, from the set of simulated position samples, a simulated position sample having a time equal to the time of the actually measured position sample;
    computing a difference value between the actually measured position sample and the simulated position sample;
    determining whether the difference value exceeds a predetermined threshold; and
    in response to determining that the difference value exceeds the predetermined threshold, combining the actually measured position sample and the simulated position sample to form an error position pair.

10. The method according to claim 7, wherein generating multiple training samples comprises, for each of the multiple error position pairs:

detecting a vehicle environment feature sample corresponding to an actually measured position sample in the error position pair;

generating a position compensation value label corresponding to the vehicle environment feature sample by computing a difference value between the actually measured position sample and a simulated position sample in the error position pair; and combining the vehicle environment feature sample and the position compensation value label to form a training sample corresponding to the error position pair.

11. The method according to claim 10, wherein detecting the vehicle environment feature sample comprises:

obtaining a time sample corresponding to the error position pair;

obtaining an image sample relating to a surrounding environment of the test vehicle captured by a sensor of the test vehicle at said time sample;

identifying a blocking object sample in the image sample;

detecting an object feature sample of the blocking object sample, the object feature sample comprising at least one of (i) a category of the blocking object sample, (ii) a shape of the blocking object sample, (iii) a size of the blocking object sample, and (iv) a position of the blocking object sample relative to the test vehicle; and combining the object feature sample and/or the time sample to form the vehicle environment feature sample.

12. An apparatus for increasing a positioning precision of a vehicle, comprising:

a processor configured to:

obtain an actually measured position of the vehicle;

detect a vehicle environment feature corresponding to the actually measured position;

compute a position compensation value based on the vehicle environment feature using a compensation value computing model; and use the position compensation value to compensate the actually measured position to increase the positioning precision of the vehicle, wherein detecting the vehicle environment feature comprises:

obtaining a time corresponding to the actually measured position;

obtaining an image relating to a surrounding environment of the vehicle captured by a sensor of the vehicle at the time;

identifying a blocking object in the image;

detecting an object feature of the blocking object, the object feature comprising at least one of (i) a category of the blocking object, (ii) a shape of the blocking object, (iii) a size of the blocking object, and (iv) a position of the blocking object relative to the vehicle; and combining the object feature and/or the time to form the vehicle environment feature.

13. The apparatus according to claim 12, wherein training of the compensation value computing model comprises:

generating a training data set using a test vehicle and a position simulation system; and using the training data set to train the compensation value computing model.

* * * * *